United States Patent Office 2,717,912
Patented Sept. 13, 1955

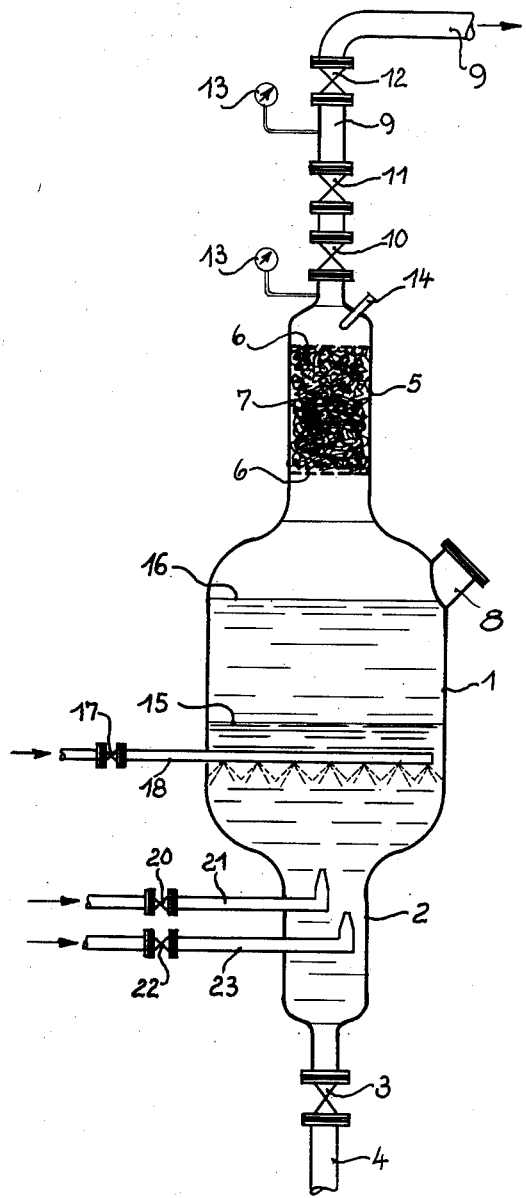

2,717,912
PROCESS AND APPARATUS FOR THE PURIFICATION OF BENZENE

Martin R. Kröger, Essen-Steele, Germany

Application October 1, 1951, Serial No. 249,043

Claims priority, application Germany October 2, 1950

8 Claims. (Cl. 260—674)

It is known that the benzene obtained from coking or gas plants in the form of the so-called light oil is very impure. It is possible, by fractional distillation to achieve an extensive removal of the materials accompanying the benzene, particularly the low boiling point fractions of the light oil, such as prussic acid, cyclopentadiene and carbon disulphide. However, on account of the presence of unsaturated materials which extend into the boiling range of the benzene, it is not possible to achieve the degree of purity such as is required for the further treatment of the benzene, e. g. nitration, or for the employment of the benzene in combustion engines.

For these reasons, in addition to the fractional distillation of the light oil a further treatment of the benzene, in particular the removal of the so-called resin forming substances is necessary. Various methods have been proposed for this additional purification.

In many cases the purification is carried out with sulphuric acid, particularly concentrated sulphuric acid. With this, however, there are considerable washing losses. It has therefore been proposed to remove the resin forming materials and other impurities by passing the benzene in the vapour phase over suitable contact masses. As however the efficiency of the contact masses decreases as the limiting surfaces thereof become occupied, the contact masses must be renewed or exchanged after a certain operating period, depending on the quantity of the materials to be removed, and this involves difficulties.

It has also been proposed to purify benzene by heating the unpurified benzene product, in contact with air, for a short period at high temperature and in the presence of water. With this known method of operation, however, it is only possible to obtain a product which is partly freed from impurities and which, after rectification gives a benzene which upon further treatment with sulphuric acid always gives a washing loss of 1.6% to 2.2%.

The invention is related to the said process for the purification of benzene by pressure treatment at high temperature. On the other hand it provides a considerable advance in relation to the separation of impurities and a decrease in the purification losses through the fact that the unpurified benzene is first of all practically freed from mono- and dicyclo-pentadiene and is then treated at high temperature and pressure with oxygen in the presence of water or steam, so that at least the impurities having a boiling point lower than or near that of the benzene are converted into high boiling point fractions, whereafter the benzene is separated from the higher boiling point fractions, preferably by distillation, and is condensed as purified benzene.

As has been found, the insufficient action of the previously suggested pressure treatment of the unpurified benzene at high temperature is due to the fact that insufficient attention was paid to the possible conversion, with an increase in temperature, of the dicyclopentadiene or the like into lower boiling fractions, particularly monocyclopentadiene. If an impure benzene containing dicyclopentadiene is heated to temperatures of about 150°–170° or higher, there takes place on the one hand a polymerisation to high polymer cyclopentadienes, and on the other hand a splitting up into monocyclopentadiene. This monocyclopentadiene readily dissolves in benzene and passes over with the benzene fraction upon rectification of the reaction product after the pressure treatment, so that this, on treatment with the sulphuric acid, shows a corresponding washing loss despite the previous pressure treatment.

If, on the other hand, in accordance with the invention the mono and dicyclopentadiene are removed before the treatment of the unpurified benzene, then, in the subsequent treatment with oxygen in the presence of water or steam at increased temperature and pressure the residual impurities of the unpurified benzene are completely oxidized or polymerized, and the rectified product, upon treatment with sulphuric acid, gives practically no washing loss.

The removal of the mono and dicyclo-pentadiene from the unpurified benzene may be effected for example by fractionating the raw benzene in a column which is operated in such a way that the distillation product within the column has a final temperature of 170°–175°, whilst there escapes as a head product the fore-running of lower boiling point than benzene, containing cyclopentadiene, carbon disulphide, prussic acid and other impurities. By the heating of the distillation material to the temperature stated the dicyclopentadiene is converted partly into polymer compounds having a higher boiling point than benzene and partly, however, into cyclopentadiene having a lower boiling point, which however, on account of the high column temperature, is immediately vaporized and escapes as a forerunning at the head, so that the base product which runs off is both free from mono and dicyclopentadiene. The unpurified benzene obtained in this way as a base product is then subjected according to the invention to the oxygen treatment at increased pressure and high temperature in the presence of water or steam.

Also the benzene fraction obtained, which in the decomposition of the light oil fore-running contains the cyclopentadiene, carbon disulphide, prussic acid and other materials, can be subjected with particular advantage to the pressure treatment according to the invention, as this benzene fraction is enriched to a higher degree than the light oil, with the impurities to be removed, particularly the resin-forming impurities.

The pressure treatment of the benzene may be effectively carried out with a pressure vessel which is operated continuously or in stages. The impure benzene and oxygen is introduced into this pressure vessel in such proportions that, having regard to the presence of steam an explosion cannot take place. Then, according to the invention, heating is effected, preferably by direct introduction of high pressure steam at high temperature.

The oxygen may enter the pressure vessel together with the benzene or separately therefrom. It is advantageous to introduce the oxygen into the pressure vessel and to distribute it in the contents thereof in such a way that it comes into contact with the light oil to be purified with the largest possible surface area. It is also in some cases advantageous to withdraw from the top of the pressure vessel, preferably continuously the oxygen which is not united with the impurities of the benzene and to reintroduce it from below into the charge. Into the resulting oxygen circuit thus created, fresh oxygen may be effectively introduced in the requisite quantity.

In the reaction vessel there are present, in the process according to the invention two liquid and two vapor phases, namely, liquid water saturated with oxygen and benzene on the one hand, secondly liquid benzene saturated with oxygen and water and thirdly a vapor mixture of water, benzene and oxygen and possibly also nitrogen and other accompanying substances if for example, air of increased oxygen content is used for the treatment instead of pure oxygen.

By introducing the steam there is obtained an effective admixture of the benzene with oxygen and water as is required for the desired reactions.

The materials forming from the impurities are partly absorbed by the water so that it is advantageous to introduce into the reaction vessel with the water or in addition thereto substances having an alkaline reaction, preferably lime, in such a quantity that the pH value of the aqueous phase is kept above 7. Another part of the material formed from the impurities of higher boiling point remains dissolved in the benzene.

After the termination of the treatment of the benzene with oxygen and water or steam at high pressure and temperature the benzene is separated from the water or led off from the reaction vessel. This may be for example effected by withdrawing the benzene from the part of the pressure vessel containing the vapor phase, with a reduction of pressure, and condensing the vapors, whereafter the condensate is fractionated or rectified with the recovery of completely pure benzene. Instead of this, it is however also possible to withdraw benzene from the pressure vessel without a substantial decrease of the pressure in the fluid phase, and to pass it at increased pressure and temperature through a separating vessel in which the water separates from the benzene by settling, if necessary after a reduction of temperature. The benzene separated from the water is then rectified, rectification preferably being carried out at practically normal pressure.

The major portion of the water or milk of lime containing materials formed from the impurities is preferably removed on its own from the pressure vessel, the direct heating of the contents of the vessel with high pressure steam, according to the invention having a favourable action since practically no deposits of materials (resins) of high boiling point can form on the wall of the reaction vessel.

The process according to the invention may also be carried out continuously. For this purpose there may be conducted through a pipe system a mixture for example of benzene, oxygen and water at increased pressure, in which the required high temperature is maintained by an external or internal supply of high pressure steam. From the pipe system the reaction liquid is then released into a vaporization chamber so that the resulting impurities of higher boiling point occur in the residue of the vapor mixture produced, whilst the vaporized material passes through one or more fractionating stages and is there broken up into pure fractions, if required after the mechanical separation of water from the benzene fraction before its rectification.

The duration of the pressure treatment employed, in the process according to the invention, in the presence of oxygen and water or steam, the pressures to be employed and the degree of treatment temperature depend in individual cases on the kind and quantity of the impurities in the raw material.

The purified benzene obtained by the process according to the invention may in some cases still contain impurities such as for example saturated and unsaturated compounds, particularly those of unbranched constitution and thiophene, i. e. substances which are undesirable for certain applications, although in the purified benzene according to the invention they are present in very small quantities only. In order to obtain the purest benzene from such purified benzene, the benzene may preferably be crystallized out by cooling and the resulting crystals be removed from the mother liquor which contains the impurities. There is then obtained a pure benzene the melting point and the like corresponds with the physical data of the chemical compound "Benzene."

Finally, it is in some cases of advantage, in the process according to the invention, to carry out the treatment of light oil with oxygen in the presence of catalysts. There come chiefly into question catalysts—such as certain organic manganese compounds or the like which are soluble in benzene hydrocarbons.

Into an autoclave of 540 liters capacity 200 liters of raw benzene are introduced and brought by means of superheated steam to 220° C. and a total pressure of 55 atm. Now during each hour 100 liters of raw benzene and an air-oxygen mixture in a ratio of 5:1 are introduced into the autoclave from below and simultaneously this quantity of benzene together with nitrogen and carbon dioxide is distilled off, the duration of the benzene in the autoclave amounting to 2 hours.

The purification obtained in the benzene can be seen from the following table:

|  | Before purification | After purification |
| --- | --- | --- |
| Density | 0.881 | 0.8825. |
| $CS_2$ Content | 2.75% | 0.03%. |
| Bromine consumption | 6.28 g./100 cm³ | 0.4 g./100 cm.³ |
| Resin formation test | 92 mg./100 cm³ | 5 mg./100 cm.³ |

The drawing shows diagrammatically an apparatus for carrying out the process according to the invention. The apparatus consists firstly of a pressure-tight container 1 of steel or other suitable material which will withstand a pressure of approximately 60 atm. This container terminates at the base in a supply pipe 2 to which is connected through a check valve 3 the discharge pipe 4. Connected to the upper end of the container 1 is a column 5 in which are provided between the sieve bases 6 suitable filler bodies e. g. Raschig rings, as indicated at 7. In the upper part of the container 1 there is a pressure-tight filling branch pipe through which water and benzene can be introduced in the liquid state into the container 1. Connected to the filler body column 5 is a discharge pipe 9 controlled by a check valve 10. In addition two throttle valves 11 and 12 are provided, by means of which the flow of steam withdrawn through the pipe 9 from the apparatus can be regulated. Pressure gauges 13 enable the pressure in the respective chambers to be measured. The temperature above the filler body tower is ascertained by a thermometer 14.

In order to start the process the container 1 is filled with water and benzene through the branch pipe 8, the water coming up to the level 15 whilst the benzene accumulates on top of the latter up to a height indicated by the line 16.

The superheated steam is supplied at a temperature of 220°–250° through the distribution pipe 18 controlled by a pressure valve 17, the pipe 18 being provided at its underside with sprinkler holes 19 through which the steam is injected into the lower part of the container.

The benzene to be purified is introduced through the pipe 21 controlled by valve 20 and the air or the air-oxygen mixture is introduced through the pipe 23 controlled by a valve 22 into the supply pipe 2.

The reaction products, namely a mixture of benzene vapor, nitrogen, carbon dioxide and steam are withdrawn through the discharge pipe 9 and separated from each other in a condensation apparatus not illustrated.

I claim:

1. A process for the purification of crude benzene containing, as impurities, monocyclopentadiene and other compounds boiling at a temperature below the boiling point of benzene, dicyclopentadiene and oxidizable, unsaturated compounds boiling at a temperature within the boiling range of benzene, said process comprising the steps of (1) heating said crude benzene at a temperature of between 170 and 175° C. to convert dicyclopentadiene contained therein to monocyclopentadiene and high polymer cyclopentadiene of higher boiling point than benzene and removing therefrom vapors of the compounds of lower boiling point including said monocyclopentadiene, (2) thereafter oxidizing the unsaturated compounds remaining in the benzene-containing fraction to compounds of higher boiling point than benzene by heating the benzene fraction with elemental oxygen under super-atmospheric pressures and at a temperature between 220° C. to 250° C. in the presence of water, and (3) thereafter recovering substantially pure benzene from the resulting mixture by fractional distillation.

2. The process of claim 1, wherein the oxidation temperature is obtained by directly contacting the benzene-containing fraction with steam at superatmospheric pressure.

3. The process of claim 1, wherein the benzene-containing fraction is oxidized with air of increased oxygen content.

4. The process of claim 1, wherein the temperature and pressure conditions during said oxidation are such that a vaporous mixture of benzene, nitrogen and water is obtained and the benzene is recovered from said mixture by distillation.

5. The process of claim 1, wherein the temperature and pressure conditions during oxidation are such that the benzene is in the liquid phase and is recovered from the compounds of higher boiling point by rectification.

6. The process of claim 1, wherein oxidation is effected in the presence of water in the liquid phase.

7. The process of claim 6, wherein the water is maintained at a pH above 7.0.

8. The process of claim 6, wherein the water is maintained at a pH of above 7.0 by addition of lime.

References Cited in the file of this patent

UNITED STATES PATENTS

| | | |
|---|---|---|
| 1,441,341 | Govers | Jan. 9, 1923 |
| 1,590,965 | Downs | June 29, 1926 |
| 1,674,472 | Jaeger | June 19, 1928 |
| 2,222,128 | Wagner | Nov. 19, 1940 |
| 2,387,993 | Hepp | Oct. 30, 1945 |
| 2,414,651 | Latchum | Jan. 27, 1947 |
| 2,447,794 | Brewer | Aug. 24, 1948 |
| 2,455,634 | Wilson | Dec. 7, 1948 |
| 2,621,213 | Joris | Dec. 9, 1952 |